(12) United States Patent
Baumann et al.

(10) Patent No.: US 7,922,264 B2
(45) Date of Patent: Apr. 12, 2011

(54) HYDRAULIC VEHICLE BRAKE SYSTEM

(75) Inventors: Dietmar Baumann, Hemmingen (DE); Dirk Hofmann, Krnov-Pod Cvilinem (CZ)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/395,917

(22) Filed: Mar. 2, 2009

(65) Prior Publication Data

US 2009/0229931 A1 Sep. 17, 2009

(30) Foreign Application Priority Data

Mar. 14, 2008 (DE) .......................... 10 2008 014 462

(51) Int. Cl.
*B60T 8/42* (2006.01)

(52) U.S. Cl. .................. 303/115.2; 303/114.1

(58) Field of Classification Search ................. 188/72.8; 303/114.1, 115.1–115.2

See application file for complete search history.

(56) References Cited

U.S. PATENT DOCUMENTS

| | | | | |
|---|---|---|---|---|
| 5,217,281 | A * | 6/1993 | Fujimoto | 303/9.63 |
| 5,246,283 | A * | 9/1993 | Shaw et al. | 303/115.2 |
| 5,590,936 | A * | 1/1997 | Reuter | 303/116.1 |
| 5,713,640 | A * | 2/1998 | Feigel et al. | 303/115.2 |
| 5,927,825 | A * | 7/1999 | Schenk et al. | 303/115.2 |
| 6,024,422 | A * | 2/2000 | Drennen et al. | 303/115.2 |
| 6,113,197 | A * | 9/2000 | Kuroki et al. | 303/11 |
| 6,164,733 | A * | 12/2000 | Uzzell | 303/122 |
| 7,114,786 | B2 * | 10/2006 | Bess et al. | 303/7 |
| 2004/0245056 | A1 * | 12/2004 | Baumann et al. | 188/72.8 |
| 2005/0121267 | A1 * | 6/2005 | Baumann et al. | 188/156 |
| 2005/0167212 | A1 * | 8/2005 | Pascucci et al. | 188/72.2 |
| 2007/0278855 | A1 * | 12/2007 | Hatano | 303/116.1 |

* cited by examiner

*Primary Examiner* — Christopher P Schwartz
(74) *Attorney, Agent, or Firm* — Ronald E. Greigg

(57) ABSTRACT

The invention proposes equipping a hydraulic vehicle brake system with a pedal travel modulator that has an electromechanically driven piston-cylinder unit. The piston-cylinder unit upon brake actuation "furnishes" additional brake fluid and thereby boosts a pedal travel of the vehicle brake system.

7 Claims, 1 Drawing Sheet

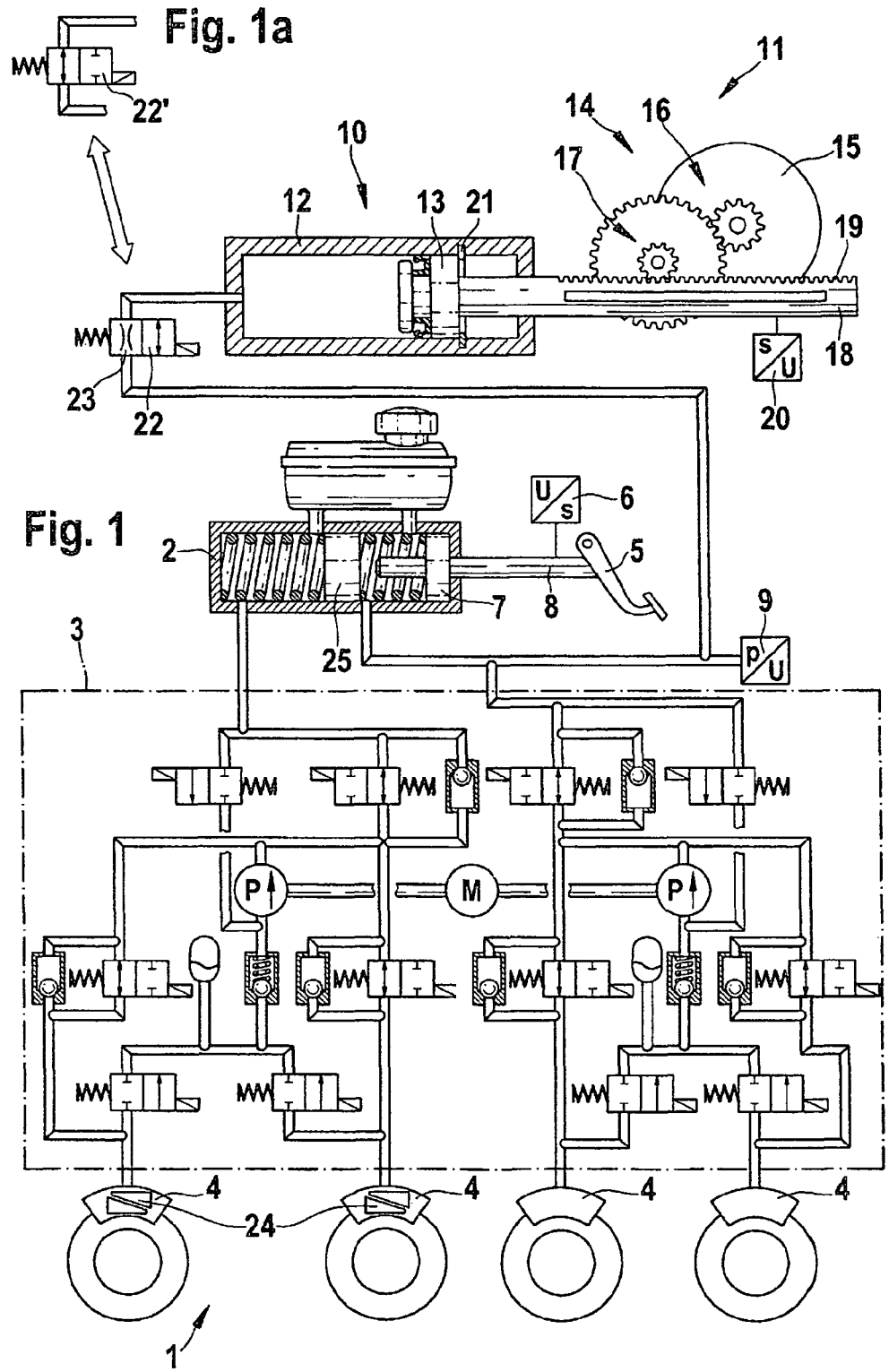

HYDRAULIC VEHICLE BRAKE SYSTEM

RELATED APPLICATIONS

This application is based on German Patent Application 10 2008 014 462.2 filed Mar. 14, 2008, upon which priority is claimed.

BACKGROUND OF THE INVENTION

1. Field of the Invention

The invention relates to a hydraulic vehicle brake system.

2. Description of the Prior Art

Such vehicle brake systems are conventional per se in motor vehicles. They have a master cylinder, which is actuated by muscle force by a vehicle driver by means of a brake pedal, or in the case of a motorcycle, by means of a manual brake lever. Wheel brake cylinders are connected hydraulically to the master cylinder. For antilock vehicle brake systems, brake pressure buildup valves and brake pressure reduction valves for modulating the brake pressure are disposed between the master cylinder and the wheel brake cylinders; for individual-wheel brake pressure modulation, one brake pressure buildup valve and one brake pressure reduction valve are disposed respectively upstream and downstream of each wheel brake cylinder. In simplified regulating systems, one brake pressure buildup valve and one brake pressure reduction valve can for instance be provided for the wheel brakes of one axle as well. Moreover, typically in each brake circuit is one hydraulic pump as a return pump and/or for pressure buildup, and a hydraulic reservoir as well as further hydraulic valves are provided. Such brake pressure regulating systems are known per se to one skilled in the art and will not be described further here, since they do not form the actual subject of the invention.

In motor vehicles, underpressure brake boosters are typical, for enhancing the muscle force of the diver of the vehicle. Electrohydraulic brake boosters and external-force brake systems are also known, in both of which an external power supply to the vehicle brake system is accomplished with a hydraulic pump that is driven by an electric motor. Temporary storage of brake fluid under pressure in a hydraulic reservoir is typical. In the event of brake boosting, or in other words a so-called auxiliary force brake system, the brake pressure generated by the driver by muscle force by actuation of the master cylinder is enhanced with the external power supply; in the case of an external force brake system, the pressure buildup is effected solely with the external power supply; the master cylinder is disconnected hydraulically from the rest of the vehicle brake system. Only upon auxiliary braking, or in other words emergency braking in the event of failure of the external power supply is the actuation effected by muscle force using the master cylinder.

OBJECT AND SUMMARY OF THE INVENTION

The hydraulic vehicle brake system of the invention takes a different course: Like conventional hydraulic vehicle brake systems, it has a master cylinder, to which the vehicle brake system is hydraulically connected and with which it is actuated by muscle force by the vehicle driver. The hydraulic vehicle brake system of the invention furthermore has an electrohydraulic pedal travel modulator that has a piston-cylinder unit which communicates with the master cylinder and which has an electromechanical drive. By actuation of the piston-cylinder unit of the pedal travel modulator, brake fluid is positively displaced from the piston-cylinder unit and reaches the master cylinder and the vehicle brake system. As a result, an actuation travel required for a brake actuation, that is, a displacement of a piston of the master cylinder, is shortened. Via the brake pedal, brake lever, or other user control element, the vehicle driver executes only a portion of the actuation travel and thus positively displaces a defined volume of brake fluid from the master cylinder into the vehicle brake system. A further volume of brake fluid is furnished by the pedal travel modulator. No force boosting takes place; the pressure in the master cylinder and in the wheel brakes is not increased by the pedal travel modulator.

The displacement of the piston in the cylinder of the piston-cylinder unit of the pedal travel modulator, or in other words the volume of brake fluid that is positively displaced from the piston-cylinder unit and delivered to the vehicle brake system, is controlled or regulated as a function of a travel of the brake pedal, that is, as a function of a displacement of the piston of the master cylinder. The term "brake pedal" is understood in general also to mean a manual brake lever or other user control element for displacing the piston of the master cylinder. The pedal travel modulator can be said to effect a travel boost of the brake pedal, or in other words it increases the volume of brake fluid positively displaced, without enhancing the requisite muscle force. The dependency may, but need not, be linear, so that with the pedal travel modulator of the invention, as a further advantage, an intrinsically arbitrary pedal characteristic can be attained, the term "pedal characteristic" being understood to mean the dependency of the pedal travel on the pedal force. Force boosting can be attained by the hydraulic boosting of the master cylinder to the wheel brakes, in that the bore and piston diameter of the master cylinder is reduced and/or the piston diameter of the wheel brake cylinder is increased. An underpressure booster or other brake force booster can be dispensed with and according to the invention is not provided. In the event of a failure of the pedal travel modulator, auxiliary braking is possible solely by muscle force, and the pedal force is not increased by the failure of the pedal travel modulator; only the pedal travel increases.

The drive of the piston-cylinder unit of the pedal travel modulator can be effected for instance with a linear motor, an electromagnet, or a piezoelectric element. An electromechanical drive with an electric motor and a mechanical gear is provided, which converts the rotary driving motion of the electric motor into a translational motion for displacing the piston in the cylinder of the piston-cylinder unit and which preferably includes a step-down gear. Since the invention makes a hydraulic force boosting from the pedal travel modulator to the master cylinder or the wheel brake cylinders possible, the invention makes do with a comparatively slight mechanical speed reduction, or even entirely without a step-down gear.

At least one self-boosting wheel brake is provided in the vehicle brake system of the invention. Preferably, the brakes of one axle are structurally identical; that is, they are either self-boosting or non-self-boosting, or all the wheel brakes can be self-boosting. Both hydraulic and mechanical self-boosting devices are known, which need not be described further here. For mechanical self-boosting devices, wedge or ramp mechanisms are known, on which a friction brake lining of a disk brake is braced displaceably in the circumferential direction of the brake disk. The rotating brake disk urges the friction brake lining into an increasingly narrower wedge gap between the oblique wedge or ramp face and the brake disk, and by the principle of the wedge, brake boosting ensues. A travel-boosting self-boosting device is provided, in which the force is not boosted, but instead the travel, or in other words the positioning motion of the friction brake lining to the brake disk, is increased. For that purpose, the wedge or ramp mechanism is braced on the piston of the hydraulic wheel brake, so that the contact pressure of the friction brake lining against the brake disk is equal in magnitude to the tensing force generated by the brake piston. The bracing of the friction brake lining at an angle obliquely to the brake disk effects a positioning motion of the friction brake lining, or in other words a travel boost. This is known per se to one skilled in the art and therefore, and because the structural design of the self-boosting device of the wheel brake or brakes does not form the actual subject of the invention, will not be described in further detail here. The self-boosting devices are not limited to the structural types claimed.

BRIEF DESCRIPTION OF THE DRAWINGS

The invention will be better understood and further objects and advantages thereof will become more apparent from the ensuing detailed description of a preferred embodiment taken in conjunction with the drawings, in which:

FIG. 1 is a schematic illustration of a vehicle brake system according to the invention; and FIG. 1a shows an alternative detail.

DESCRIPTION OF THE PREFERRED EMBODIMENT

The vehicle brake system according to the invention, shown in FIG. 1 and identified overall by reference numeral 1, has a dual-circuit master cylinder 2, to which wheel brakes 4 are connected via a hydraulic anti-lock and traction control unit 3. The traction control unit 3 is of a design known per se; for example, the ESP System 8.0 of the Applicant can be used, which makes individual-brake pressure regulation possible. Such anti-lock and traction control systems are known to one skilled in the art, so that they need not be explained here.

The master cylinder 2 and with it the vehicle brake system 1 are actuated by muscle force, using a brake pedal 5. In the case of a hand brake, a brake lever, instead of the brake pedal 5, would be provided as a user control element. With a travel sensor 6, a pedal travel of the brake pedal 5 or a piston travel of a rod piston 7 of the master cylinder 2, which piston is connected mechanically to the brake pedal 5 via a piston rod 8, is measured. A pressure sensor 9 is connected to one of the two brake circuits of the vehicle brake system 1.

An actuation of the vehicle brake system 1 is effected in the usual way by pressing down on the brake pedal 5, or in other words by actuating the master cylinder 2, from which brake fluid is positively displaced as a result; the brake fluid builds up a brake pressure in cylinders of the wheel brakes 4, which communicate with the master cylinder 2. Individual-wheel brake pressure regulation in the brake cylinders of the wheel brakes 4 is effected as needed automatically, with the hydraulic anti-lock and traction control unit 3.

One circuit of the master cylinder 2, which in the exemplary embodiment is the rod circuit, communicates with a piston-cylinder unit 10 of a pedal travel modulator 11. The piston-cylinder unit 10 of the pedal travel modulator 11 has a cylinder 12, in which a modulator piston 13 is displaceable. The pedal travel modulator 11 has an electromechanical drive 14, with an electric motor 15 that displaces the modulator piston 13 in the cylinder 12 via a gear wheel step-down gear 16 and a rack gear 17. A piston rod 18 of the modulator piston 13 has a rack 19, which is part of the rack gear 17.

Driving the modulator piston 13 causes brake fluid to be positively displaced out of the cylinder 12 of the piston-cylinder unit 10 of the pedal travel modulator 11 into the rod circuit of the master cylinder 2 or the vehicle brake system 1. The hydraulic pressure is not increased as a result; it is determined solely by the muscle force exerted on the brake pedal 5, which force acts on the rod piston 7 of the master cylinder 2. However, the volume of brake fluid made available by the pedal travel modulator 11 shortens the pedal travel required for building up a defined brake force; that is, by means of the pedal travel modulator 11, a kind of hydraulic travel boosting is effected. As a result, a greater hydraulic force boosting is possible by means of a smaller diameter of the pistons of the master cylinder 2 in proportion to the pistons in the cylinders of the wheel brakes 4, and as a result, in turn, a brake booster, such as an underpressure brake booster, can be dispensed with.

The pedal travel modulator 11 is controlled or regulated as a function of the pedal travel of the brake pedal 5; this travel is measured by the travel sensor 6. The control or regulation of the pedal travel modulator 11 is effected with an electronic control unit, not shown, which preferably simultaneously controls the hydraulic anti-lock and traction control unit 3, or in other words the ESP unit, as well. In other words, the control or regulation of the pedal travel modulator 11 can be integrated with the control unit, which is present anyway, of the hydraulic anti-lock and traction control unit 3. The control or regulation of the pedal travel modulator 11 can be effected with a linear or other kind of fundamentally arbitrary dependency on the pedal travel. The pedal travel modulator 11 has a travel sensor 20 for measuring the displacement of the modulator piston 13. As a result, an intrinsically arbitrary pedal characteristic can be achieved, the term pedal characteristic meaning the dependency of the pedal travel of the brake pedal 5 on the muscle force exerted on the brake pedal 5.

In the event of failure of the pedal travel modulator 11, braking is effected solely by muscle force in the usual way, by pressing down on the brake pedal 5. Since the pedal travel modulator 11 does not cause any force boosting but only travel boosting, the actuation force required for actuating the vehicle brake system 1, that is, the muscle force to be exerted on the brake pedal 5, is not increased; only the pedal travel is lengthened. The modulator piston 13 has a piston reverse-stroke limiter, which defines its basic position when the vehicle brake system 1 is not actuated but instead is released. In the exemplary embodiment, a spring ring 21, as a piston reverse-stroke limiter 21, is inserted into a groove of the cylinder 12 of the piston-cylinder unit of the pedal travel modulator 11. The piston reverse-stroke limiter, in the event of failure of the pedal travel modulator 11, prevents brake fluid upon brake actuation from being positively displaced out of the master cylinder 2 into the cylinder 12 of the piston-cylinder unit 10 of the pedal travel modulator 11. In the event of failure of the pedal travel modulator 11, the brake fluid positively displaced from the master cylinder 2 upon actuation is entirely available for the actuation of the wheel brakes 4, and no brake fluid is "lost" into the cylinder 12 of the piston-cylinder unit 10 of the pedal travel modulator 11. The piston reverse-stroke limiter 21 defines a basic position of the modulator piston 13 when the vehicle brake system is not actuated; displacement from the basic position and an alteration of the pedal characteristic are prevented.

Since the pedal travel modulator 11 acts on only one of the two brake circuits of the vehicle brake system 1, the hydraulic disconnection of the two brake circuits remains assured.

A valve 22 is disposed between the piston-cylinder unit 10 of the pedal travel modulator 11 and the master cylinder 2, or the vehicle brake system 1. In the exemplary embodiment, this is a 2/2-way magnet valve, which in its currentless basic position connects the piston-cylinder unit 10 to the master cylinder 2 and the vehicle brake system 1 by means of a throttle restriction 23. In a switching position when current is being supplied, the valve 22 is open; that is, it connects the piston-cylinder unit 10 of the pedal travel modulator 11 to the master cylinder 2 and to the vehicle brake system 1. In normal operation, current is supplied to the valve 22; that is, it is open, and its opening is effected for instance with the activation of an ignition of a motor vehicle. In the event of an electrical failure or of the pedal travel modulator 11, the valve 22 switches over to the currentless basic position. If the failure takes place during braking with the master cylinder 2 actuated, the throttle restriction 23 of the valve 22 throttles the flow of brake fluid from the master cylinder 2 into the cylinder 12 of the piston-cylinder unit 10 of the pedal travel modulator 11, so that the brake pedal 5 does not "collapse" but instead yields slowly and spares the vehicle driver from the shock of sensing a total failure of the vehicle brake system 1. The failure of the pedal travel modulator 11 can be ascertained from the lack of motion of the modulator piston 13 that is measured with the travel sensor 20. Since the valve 22 is switched over quite infrequently, namely when the ignition is switched on and off, it has a very long service life.

As an alternative, the valve 22' shown in FIG. 1*a* can be provided instead of the valve 22. It is a 2/2-way magnet valve, which is open in its currentless basic position and closed in its switching position when current is being supplied. By closure of the valve 22', the piston-cylinder unit 10 is disconnected hydraulically from the master cylinder 2 and the vehicle brake system 1, so that a supply of current to the electric motor 15 can be switched off when the vehicle brake system is actuated during braking. In braking events that are long-lasting, the electric motor 15 can thereby be thermally relieved.

In a preferred embodiment of the invention, some of the wheel brakes 4, or all the wheel brakes 4, are self-boosting. Preferably, the wheel brakes 4 of one or more or all the vehicle axles are self-boosting; because of the greater braking power, the wheel brakes 4 of a front axle are preferably self-boosting. In the drawing, the self-boosting of the two wheel brakes 4 shown on the left is represented by the symbol for a wedge mechanism 24. Self-boosting wheel brakes are known to one skilled in the art, so that further explanation is unnecessary. Other known kinds of brakes include hydraulic and mechanical self-boosting devices, the latter in particular having wedge or ramp mechanisms that brace a friction brake lining, which is displaceable in the circumferential direction of a brake disk, obliquely to the brake disk. For the invention, travel-boosting wheel brakes 4 are preferred, in which some of the positioning travel of the friction brake linings toward the brake disk is effected by the displacement of the friction brake lining in the direction of rotation of the brake disk with the wheel brake 4 actuated, because of the oblique bracing in the brake caliper with the wedge or ramp mechanism. As a result, the volume of brake fluid, which must be positively displaced from the master cylinder 2, that is required for brake actuation is reduced; the requisite pedal travel is shortened. The pedal travel shortening also results if even only some of the wheel brakes 4 are self-boosting or travel-boosting, and it is not necessary for all the wheel brakes 4 to be self-boosting or travel-boosting. Via the floating piston 25 of the master cylinder 2, the travel boost also acts on the respective other brake circuit of the vehicle brake system 1.

A small diameter of the modulator piston 13 results in great travel reduction and great force boosting, as a result of which a slight travel reduction of the mechanical gear wheel gear 16 is possible, under some circumstances even an omission of the gear wheel gear 16 and a direct drive of the piston rod 18 via the gear rack drive 17 with the electric motor 15.

The foregoing relates to a preferred exemplary embodiment of the invention, it being understood that other variants and embodiments thereof are possible within the spirit and scope of the invention, the latter being defined by the appended claims.

We claim:

1. A hydraulic vehicle brake system, comprising:
   a service brake actuated by muscle power force on the brake pedal;
   a master cylinder for actuating the vehicle brake system; and
   an electrohydraulic pedal travel modulator having a piston-cylinder unit that communicates with the master cylinder, having an electric motor drive mechanism which is controlled as a function of an actuation travel of the master cylinder in such a way that a volume of pressure fluid positively displaced into the master cylinder by the pedal travel modulator has a hydraulic pressure that corresponds to the hydraulic pressure in the master cylinder generated by the muscle force on the brake pedal from the service brake, and having a piston reverse-stroke limiter, which limits a reverse stroke of the modulator piston in a release direction of the vehicle brake system, wherein the piston reverse-stroke limiter is embodied as a spring ring inserted into a groove of the cylinder.

2. The hydraulic vehicle brake system as defined by claim 1, wherein the drive mechanism of the pedal travel modulator has an electric motor and a mechanical gear.

3. The hydraulic vehicle brake system as defined by claim 1, wherein the piston-cylinder unit of the pedal travel modulator has a piston reverse-stroke limiter, which limits a reverse stroke of a modulator piston of the piston-cylinder unit in a release direction of the vehicle brake system; and that in a non-actuated basic position with the vehicle brake system released, the modulator piston rests on the piston reverse-stroke limiter.

4. The hydraulic vehicle brake system as defined by claim 1, further comprising a throttle restriction disposed between the piston-cylinder unit of the pedal travel modulator and the master cylinder.

5. The hydraulic vehicle brake system as defined by claim 1, further comprising a valve disposed between the piston-cylinder unit of the pedal travel modulator and the master cylinder.

6. The hydraulic vehicle brake system as defined by claim 1, wherein the vehicle brake system has at least one self-boosting wheel brake.

7. The hydraulic vehicle brake system as defined by claim 6, wherein the vehicle brake system has at least one travel-boosting wheel brake.

* * * * *